United States Patent
Oswal et al.

(10) Patent No.: US 7,298,838 B2
(45) Date of Patent: Nov. 20, 2007

(54) ADAPTIVE CANCELLATION NETWORK SYSTEM AND METHOD FOR DIGITAL SUBSCRIBER LINE

(75) Inventors: Sandeep K. Oswal, Bangalore (IN); Prakash Easwaran, Bangalore (IN); Arijit Raychowdhury, West Lafayette, IN (US); Fernando A. Mujica, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 806 days.

(21) Appl. No.: 10/234,510

(22) Filed: Sep. 3, 2002

(65) Prior Publication Data

US 2003/0147526 A1  Aug. 7, 2003

Related U.S. Application Data

(60) Provisional application No. 60/354,643, filed on Feb. 5, 2002.

(51) Int. Cl.
*H04M 1/00* (2006.01)

(52) U.S. Cl. ............... 379/406.04; 379/406.01; 379/406.06; 379/406.08

(58) Field of Classification Search ........... 379/406.01, 379/406.02, 406.04, 406.06, 406.08
See application file for complete search history.

(56) References Cited

U.S. PATENT DOCUMENTS

| 4,246,582 A | 1/1981 | Kondo et al. |
|---|---|---|
| 4,785,465 A | 11/1988 | Lang et al. |
| 5,416,776 A | 5/1995 | Panzarella et al. |
| 5,506,868 A | 4/1996 | Cox et al. |
| 5,572,517 A | 11/1996 | Safadi |
| 5,623,514 A | 4/1997 | Arai |
| 5,696,765 A | 12/1997 | Safadi |
| 5,802,169 A | 9/1998 | Frantz et al. |
| 5,999,540 A | 12/1999 | McGhee |
| 5,999,565 A | 12/1999 | Locklear, Jr. et al. |
| 6,021,158 A | 2/2000 | Schurr et al. |
| 6,101,216 A | 8/2000 | Henderson et al. |
| 6,160,843 A | 12/2000 | McHale et al. |
| 6,163,579 A | 12/2000 | Harrington et al. |
| 6,192,109 B1 | 2/2001 | Amrany et al. |
| 6,208,732 B1 * | 3/2001 | Moschytz et al. .......... 379/402 |
| 6,295,343 B1 | 9/2001 | Hjartarson et al. |
| 6,385,203 B2 | 5/2002 | McHale et al. |
| 6,385,252 B1 | 5/2002 | Gradl et al. |
| 6,400,772 B1 | 6/2002 | Chaplik |
| 6,477,250 B1 * | 11/2002 | Sheets ...................... 379/394 |
| 6,483,870 B1 | 11/2002 | Locklear, Jr. et al. |
| 6,724,890 B1 * | 4/2004 | Bareis ....................... 379/403 |
| 2001/0048716 A1 | 12/2001 | Gough et al. |

FOREIGN PATENT DOCUMENTS

| JP | 56 051135 A | 5/1981 |
|---|---|---|
| JP | 02 283131 A | 11/1990 |
| JP | 05 063606 A | 3/1993 |

* cited by examiner

*Primary Examiner*—Jefferey F Harold
(74) *Attorney, Agent, or Firm*—Steve A. Shaw; W. James Brady; Frederick J. Telecky, Jr.

(57) ABSTRACT

A method for reducing transmit echo in a DSL modem comprises selecting at least one cancellation device of a plurality of cancellation devices. An attenuation signal is generated using the selected cancellation device. At least a portion of transmit echo is removed from a receive signal using the attenuation signal.

19 Claims, 4 Drawing Sheets

ADAPTIVE CANCELLATION NETWORK SYSTEM AND METHOD FOR DIGITAL SUBSCRIBER LINE

RELATED APPLICATION

This Application claims the priority under 35 U.S.C. §119 of provisional application Ser. No. 60/354,643, entitled "Adaptive Hybrid Architecture for ADSL," filed Feb. 5, 2002.

TECHNICAL FIELD OF THE INVENTION

This invention relates generally to DSL and, more specifically, to an adaptive cancellation network.

BACKGROUND OF THE INVENTION

DSL (Digital Subscriber Line) provides Internet users with a technology that provides higher bandwidth and takes advantage of the installed base of copper twisted-pair telephone wire that exists between the telephone company central offices (COs) and local residential customers. ADSL (Asymmetric Digital Subscriber Line) is a form of DSL technology that transmits more information in one direction than the other. ADSL separates the available frequencies in a wire on the assumption that most residential users download much more information than they upload.

In DSL systems, analog echo cancellation is used to prevent saturation of the receiver circuitry by the transmit signal. A cancellation device in a DSL modem models the transmit echo path transfer function to attenuate the unwanted transmit signal and noise that appears in the receiver path. The line impedance, and therefore the transmit echo, varies greatly for different loop topologies and numbers of bridged-taps. Therefore, a single cancellation device cannot achieve the same echo cancellation levels for all possible loop scenarios.

SUMMARY OF THE INVENTION

One aspect of the invention is a method for reducing transmit echo in a DSL modem comprises selecting at least one cancellation device of a plurality of cancellation devices. An attenuation signal is generated using the selected cancellation device. At least a portion of transmit echo is removed from a receive signal using the attenuation signal.

The invention has several important technical advantages. Various embodiments of the invention may have none, some or all of these advantages. The invention might allow a DSL or an ADSL modem to adapt to various loop topologies. This might include the advantage of improving the transmit signal attenuation for the given loop topology allowing for a lower received noise floor. Better transmit signal attenuation allows a DSL user to receive a more powerful and accurate receive signal from the central office or for the central office to receive a more powerful transmit signal from the DSL user. A further advantage might be decreased production costs for DSL modems as fewer designs and implementations might be required. Another advantage might be an improved signal-to-noise ratio. Other technical advantages of the present invention will be readily apparent to one skilled in the art.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF EXAMPLE EMBODIMENTS OF THE INVENTION

Figure 1:
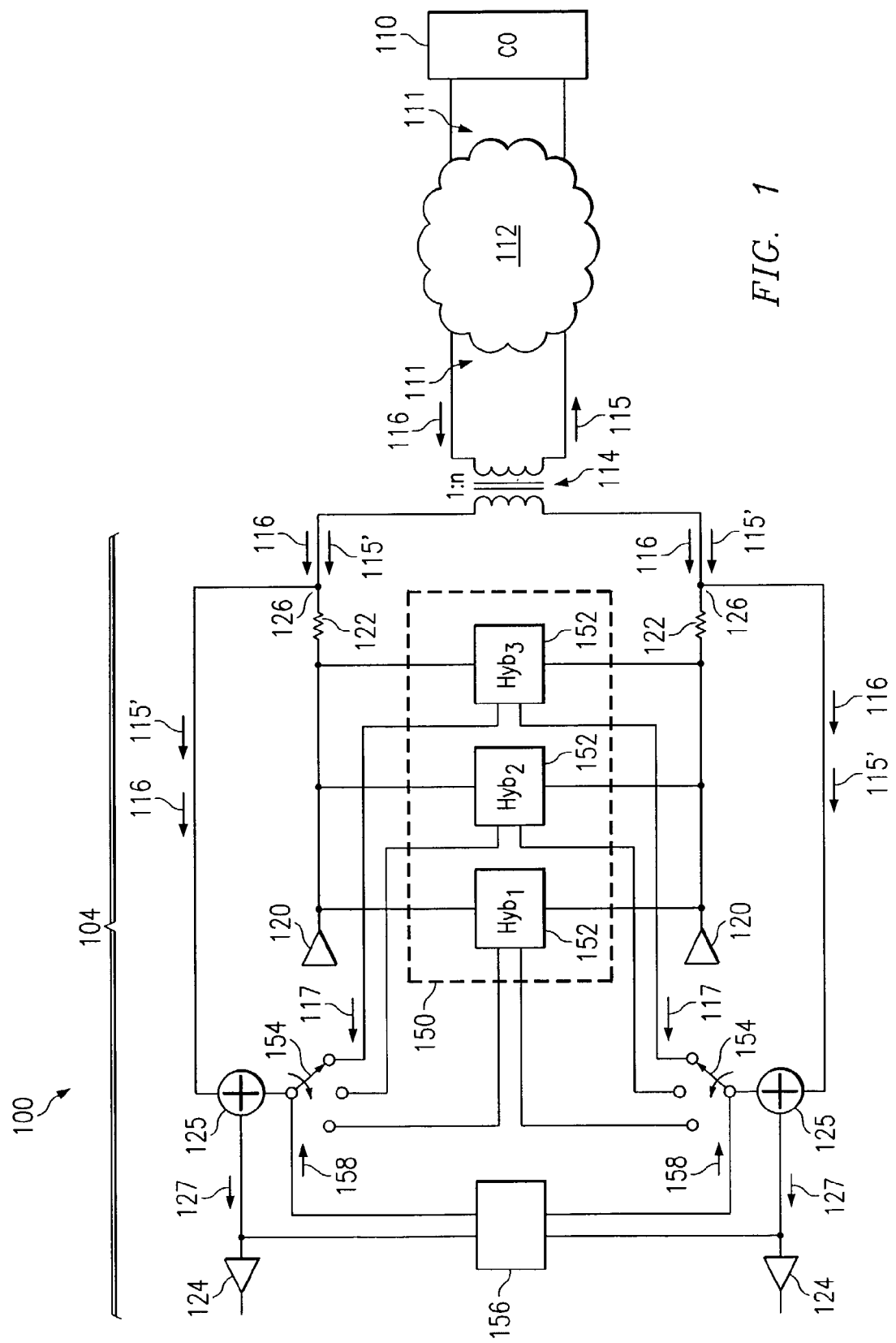
FIG. 1 is a diagram illustrating a DSL system in accordance with one embodiment of the present invention.

FIG. 1 is a diagram illustrating a DSL system 100 in accordance with one embodiment of the present invention. Generally, in DSL systems, both transmit signal 115 and receive signal 116 share the same physical media. Therefore, DSL receiver circuitry accommodates the receiver signal 116 and the locally generated transmit signal 115. The component of the transmit signal 115 and the noise that appears in the receiver circuitry is typically termed "transmit echo" 115'. Since the receiver circuitry accommodates both the receiver signal 116 and the transmit echo 115', the larger the transmit echo 115', the lower the effective signal-to-noise ratio of the system 100. DSL system 100 attenuates the transmit echo 115', thereby improving performance of system 100 for a DSL user or provider. A particular advantage of system 100 is that the attenuation of transmit echo 115', illustrated as attenuation signal 117, adapts according to the various loop topologies associated with system 100.

DSL system 100 includes central office 110, communications line 111, topology 112, and remote terminal 104. Remote terminal 104 is separated from central office 110, communications line 111, and topology 112 by transformer 114. For example, transformer 114 may connect a telephone line to a DSL modem. In one embodiment, the turns ratio of the transformer 114 may be used to provide gain to the transmit signal 115. It will be understood that while FIG. 1 illustrates the attenuation of transmit echo 115' associated with the transmit signal 115 communicated by a DSL user, the attenuation of transmit echo 115' may alternatively or additionally be associated with a transmit signal 115 communicated by central office 110, without departing from the scope of this disclosure. The various features and functions described hereto may be embodied in equipment, such as a DSL modem, located at the customer premises or at the central office.

It will be understood that transmissions from the central office 110 to the remote terminal 104 and the transmissions from the remote terminal 104 to the central office 110 are collocated on communications line 111. In this embodiment, downstream communication travels from central office 110 to remote terminal 104. Conversely, upstream communication travels from remote terminal 104 to central office 110.

Communications line 111 may comprise, for example, a subscriber loop comprising a twisted pair, which is a pair of individually insulated electrically-conductive wires twisted together. The length of communications line 111 is generally from zero kilofeet to twenty kilofeet. Communications over communications line 111 include a transmit signal 115 and a receive signal 116. Communications line 111 may include any number, including zero, of bridged-taps or other sources of line impedance, illustrated by topology 112.

Topology 112 may illustrate any number of bridge-taps and other impedances of communications line 111. The loop topology of system 100 may vary according to the characteristics of the topology 112 of communications line 111. For example, system 100 may include an ANSI T1.601 CSA (Carrier Serving Area) loop (such as, for example, CSA 4, CSA 6, and CSA 7 loop topologies), a straight loop topology (no bridged-taps), an ANS 13 loop topology, or any other appropriate loop topology based, at least in part, on loop length and number of bridged-taps.

Remote terminal 104 is an exemplary illustration of a portion of a DSL modem, a portion of an ADSL modem, or a portion of any other customer premises equipment (CPE) that may utilize the present invention. Remote terminal 104 includes a plurality of line drivers 120, a plurality of resistors 122, a plurality of line receivers 124, at least one summing node 125, at least one input node 126, adaptive cancellation network 150, switch 154, and controller 156. In one embodiment, line drivers 120 comprise operational amplifiers (op-amps) that communicate transmit signal 115 and line receivers 124 comprise op-amps that receive the receive signal 116.

Adaptive cancellation network 150 includes a plurality of cancellation devices 152. It will be understood that there may be any number of cancellation devices 152. Cancellation device 152 may include a hybrid network or any other circuitry operable to generate an attenuation signal 117 suitable to attenuate transmit echo 115'. As will be understood by those skilled in the art at the time of the invention, the transmit echo transfer function determines the amount of transmit echo 115' for communications line 111:

$$H_{TX} = \frac{Z'}{2 \cdot R_T + Z'}$$

where Z' is the impedance of communication line 111 as seen from the transmit terminals of the transformer 114 and $R_T$ is the value of resistor 122. As described in more detail in FIGS. 3A-B, the energy of transmit echo 115' varies based, at least in part, on the loop topology of system 100. The voltage of transmit echo 115' is computed by multiplying the transfer function associated with transmit echo 115' ($H_{TX}$) by the voltage of the transmit signal 115 and noise ($V_{TX}$). Consequently, the signal at input node 126, shown below as $V'_{RX}$, can be determined by the following function:

$$V'_{RX} = H_{TX} \cdot V_{TX} + V_{RX}$$

where $V_{RX}$ is the voltage of the received signal 116. The transmit echo 115', $H_{TX}V_{TX}$, may be attenuated by an appropriate cancellation device 152. The cancellation device 152 generates an attenuation signal 117 and communicates it to summing node 125. Consequently, the output at summing node 125, shown below as $V''_{RX}$, can be determined by the following function:

$$V''_{RX} = H_{TX} \cdot V_{TX} + V_{RX} - V_{TX}H_{Hyb}$$

$$V''_{RX} = (H_{TX} - H_{Hyb})V_{TX} + V_{RX}$$

where $V_{TX}H_{Hyb}$ is the attenuation signal 117. The output of summing node 125 is illustrated as received energy 127. It will be understood that preferably, but not necessarily, $H_{Tx}$ and $H_{Hyb}$ substantially equal each other thereby attenuating transmit echo 115'. This allows the received energy 127 to substantially equal the receive signal 116.

Each cancellation device 152 generates a different range of attenuation signals 117. Different attenuation signals 117 optimally attenuate transmit echo 115' for different loop topologies. Therefore, adaptive cancellation network 150 selects one or more appropriate cancellation devices 152 based, at least in part, on the loop topology of system 100. For example, multiple cancellation devices 152 may be selected at a time so that each generates an attenuation signal 117 that, in the aggregate, may attenuate transmit echo 115'. In one embodiment, controller 156 analyzes received energy 127 and communicates a control signal 158 to switch 154 based on the received energy 127. Switch 154 selects the one or more appropriate cancellation devices 152 based, at least in part, on the control signal 158. In another embodiment, the adaptive cancellation network 150 is adapted by selecting the one or more appropriate cancellation devices 152 through implementing some of its components as a binary weighted bank of components (such as, resistors and capacitors) that can effectively take different values depending on a control signal 158.

In one example, adaptive cancellation network 150 includes a first cancellation device 152, a second cancellation device 152, and a third cancellation device 152. In this example, the first cancellation device 152 is operable to effectively attenuate transmit echo 115' in a first loop topology, such as a straight loop topology, the second cancellation device 152 is operable to effectively attenuate transmit echo 115' in a second loop topology, such as a CSA 5 loop topology, and the third cancellation device 152 is operable to effectively attenuate transmit echo 115' in a third loop topology, such as an ANS 13 loop topology.

Each cancellation device 152 may further generate an effective attenuation signal 117 for a cluster of loop topologies. In a second example, adaptive cancellation network 150 includes a first cancellation device 152, a second cancellation device 152, and a third cancellation device 152. In this example, the first cancellation device 152 is operable to effectively attenuate transmit echo 115' in a first loop topology, the second cancellation device 152 is operable to effectively attenuate transmit echo 115' in a second loop topology, and the third cancellation device 152 is operable to effectively attenuate transmit echo 115' for a third loop topology and further operable to effectively attenuate transmit echo 115' for a fourth loop topology.

In one aspect of operation, line driver 120 transmits the transmit signal 115 to the central office 110 over communications line 112. A portion of transmit signal 115 appears at transformer 114 as transmit echo 115'. The central office 110 transmits the receive signal 116 to the remote terminal 104 over communications line 111. At least one selected cancellation device 152 generates an attenuation signal 117. At summing node 125, the one or more attenuation signals 117 attenuate some or all of transmit echo 115'. As a result, received energy 127 primarily comprises receive signal 116.

There are numerous techniques that may be utilized to select the appropriate cancellation device 152 used to generate the attenuation signal 117. In one example, the central office 110 is in a quiet state and does not communicate a receive signal 116. A transmit signal 115 is transmitted over communications line 111 and transmit echo 115' is received. A first cancellation device 152 generates a first attenuation signal 117. A first received energy 127 is determined at summing node 125 using transmit echo 115' and first attenuation signal 117. A second cancellation device 152 generates a second attenuation signal 117. A second received energy 127 is determined at summing node 125 using transmit echo 115' and second attenuation signal 117. The cancellation device 152 associated with the lowest received energy 127 generally performs the best job of attenuating transmit echo 115' and is therefore selected.

In a second example, a test transmit signal 115 is transmitted over the communications line 111. The received energy 127 calculated at summing node 125 is analyzed. The impedance of the communications line 111 is estimated based, at least in part, on the received energy 127, known characteristics about line 111 and topology 112, and/or any other information regarding system 100. An appropriate cancellation device 152 is selected based at least in part upon the transmit echo transfer function. Once selected, the cancellation device 152 substantially attenuates, or cancels, the transmit echo 115'.

Figure 2A:
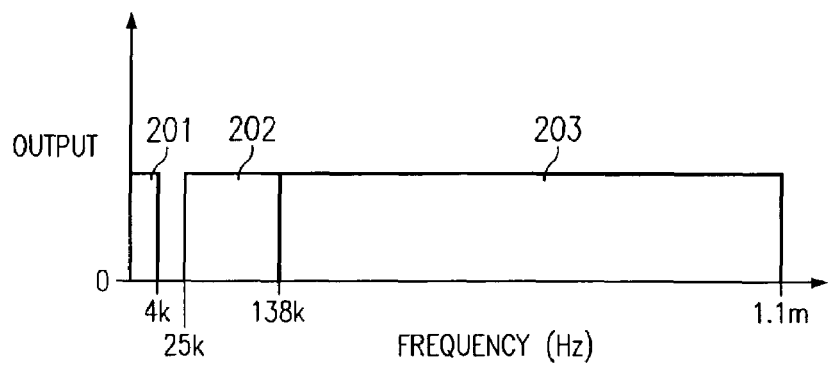
FIGS. 2A-C are exemplary charts illustrating the effect of improved cancellation in the DSL system of FIG. 1.
Figure 2B:
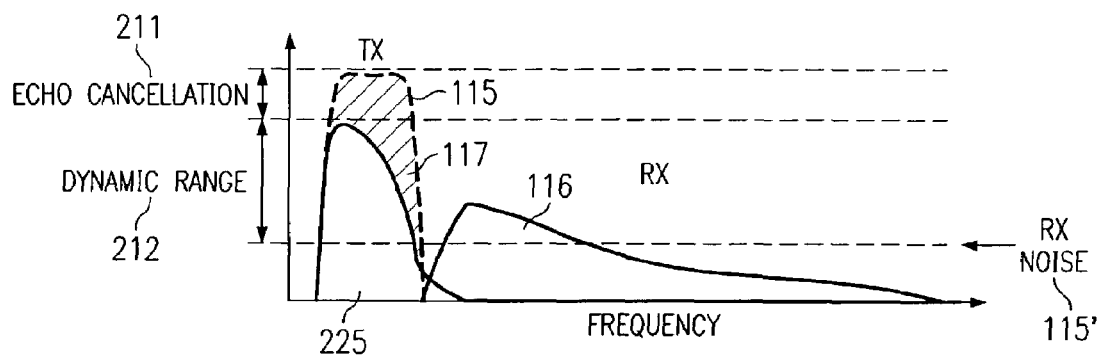
Figure 2C:
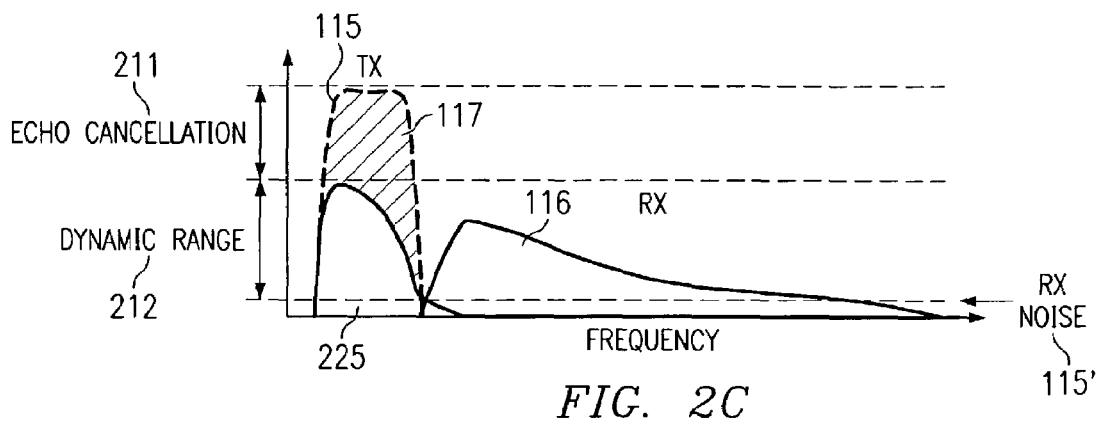

FIGS. 2A-C are exemplary charts illustrating the effect of improved cancellation in the DSL system 100. Referring now to FIG. 2A, the chart illustrates an ADSL frequency distribution and includes two axes, output and frequency. FIG. 2A includes POTS/ISDN frequency range 201, ADSL upstream frequency range 202, and ADSL downstream frequency range 203. Typically, POTS/ISDN frequency 201 is between 0 and 4 kHz, upstream frequency is between 25 kHz and 138 kHz, and downstream frequency is between 138 kHz and 1.1 MHz.

FIGS. 2B-C illustrate the effects of improving the signal-to-noise ratio (SNR) by more closely matching the attenuation signal 117 to the transmit echo 115'. FIGS. 2B-C include transmit signal voltage 115 as seen in the remote terminal 104, transmit echo 115', receive signal voltage 116, attenuation signal 117, echo cancellation 211, dynamic range 212, and attenuated transmit signal 225.

As described above, transmit echo 115' is the portion of the transmit signal 115 that appears in the secondary terminals of the transformer 114. Echo cancellation 211 is an estimated energy to subtract from the transfer signal 115. Dynamic range 212 is the generally fixed energy range of the receiver 124.

FIGS. 2B-C illustrate that as the estimated energy of the attenuation signal 117 grows closer to the first transmit echo 115' in FIG. 2B, the voltage of the attenuated transmit signal 115 will fall by a particular amount allowing the fixed dynamic range 212 to include more of receive signal 116. In other words, once the transmit signal 115 is reduced to the attenuated transmit signal 115 in FIG. 2C, the second transmit echo 115' in FIG. 2C is lower than the first transmit echo 115' in FIG. 2B. This results in a stronger receive signal 116 at the receiver 124 and a higher signal to noise ratio for receive signal 116.

Figure 3A:
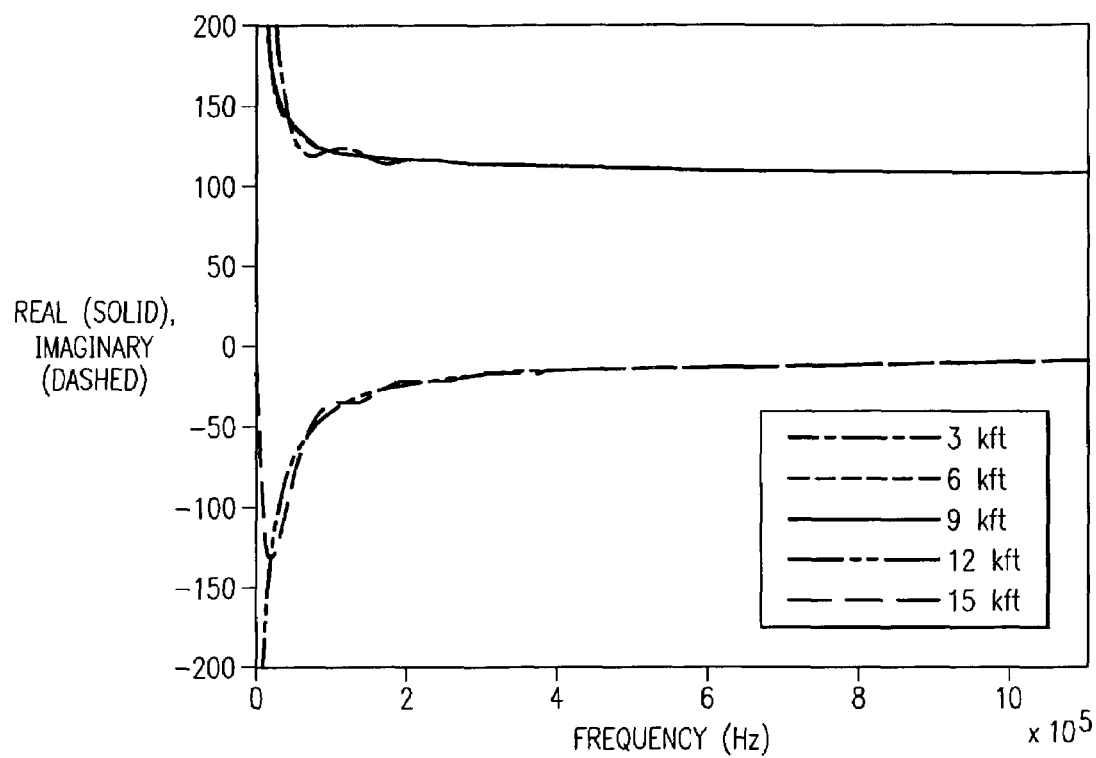
FIGS. 3A-B are charts illustrating various loop impedances.
Figure 3B:
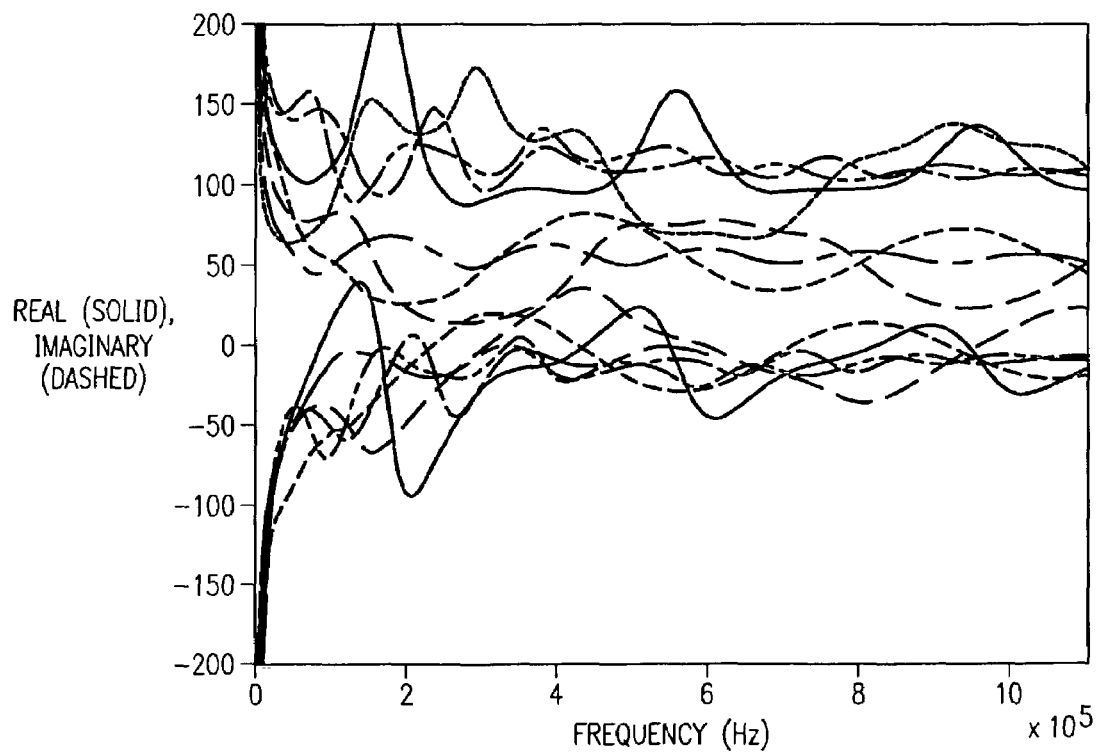

FIGS. 3A-B are charts illustrating line impedances for various loop topologies. FIG. 3A illustrates the impedance of a straight loop topology. A straight loop is a loop topology without any significant bridged-taps or other sources of line impedances. Therefore, the transmit echo 115' is generally predictable with high accuracy.

FIG. 3B illustrates the various line impedances of different loop topologies measured at different lengths, in kilofeet, of the communications line 111. Each loop topology has variable impedances, resulting in variable transmit echo signals 115'. Therefore, adaptive cancellation network 150 determines the appropriate cancellation device 152 to attenuate transmit echo 115' for each loop topology.

Figure 4A:
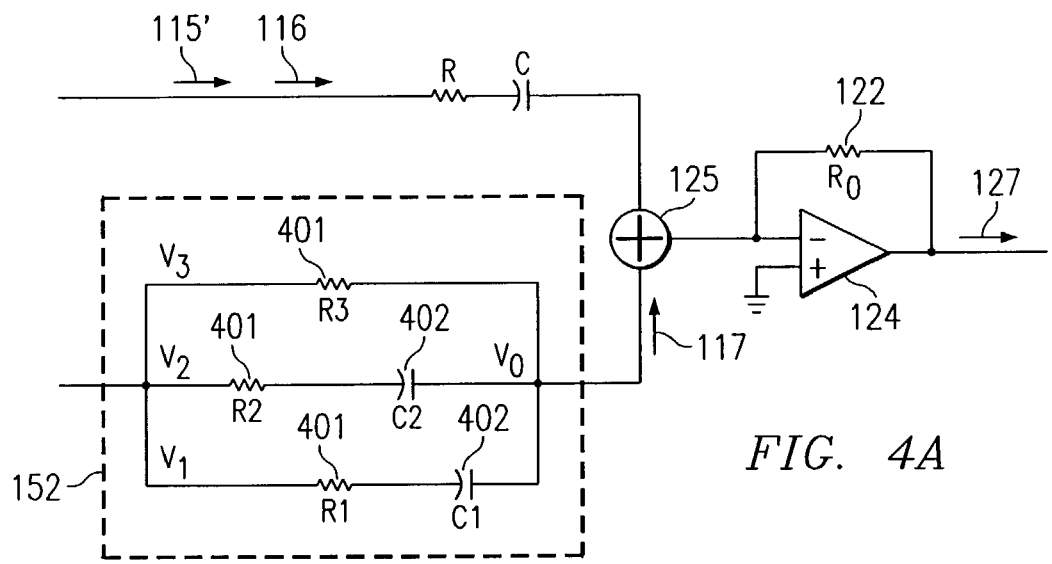
FIGS. 4A-B are diagrams illustrating a passive cancellation network and an active cancellation network respectively.
Figure 4B:
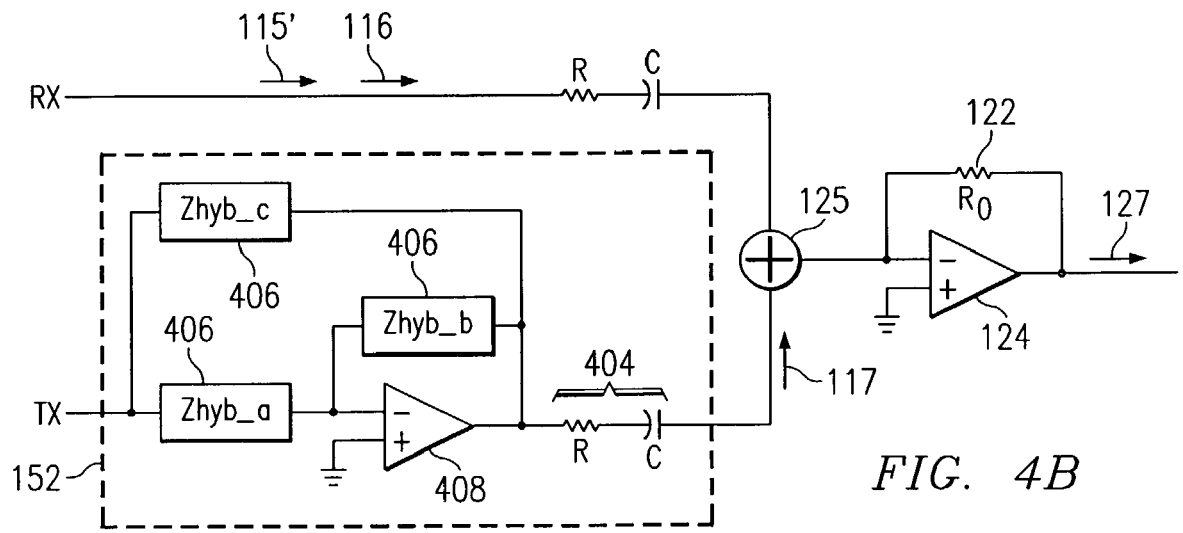

FIG. 4A illustrates one embodiment of a passive cancellation device 152 and FIG. 4B illustrates one embodiment of an active cancellation device 152.

Referring to FIG. 4A, passive cancellation device 152 includes three resistors 401 and two capacitors 402. By varying these exemplary components, various attenuation signals 117 may generated. In one embodiment, the energy of the attenuated signal 117, illustrated here as $V_0$, can be computed by:

$$V_0 = \left[ \frac{V_1 R_0}{R_1} + \frac{V_2 R_0}{R_2} + \frac{V_3 R_0}{R_3} \right]$$

Referring to FIG. 4B, active cancellation device 152 includes HPF (high pass filter) 404, Zhyb_a 406, Zhyb_b 406, Zhyb_c 406, and op-amp 408. Zhyb_a 406, Zhyb_b 406, Zhyb_c 406 are complex impedances or a network of resistors and capacitors. The active cancellation device 152 implements a given transmit echo transfer function. By varying the components in Zhyb_a 406, Zhyb_b 406, and/or Zhyb_c 406, active cancellation device 152 implements a modified transfer function for a given loop topology. It will be understood that FIG. 4B is an example active cancellation network and may be implemented in a number of ways. For example, the HPF 404 can be moved to the beginning of the cancellation path to benefit dynamic range.

Although the present invention has been described in detail, it should be understood that various changes, substitutions and alterations can be made hereto without departing from the sphere and scope of the invention as defined by the appended claims.

To aid the Patent Office, and any readers of any patent issued on this application in interpreting the claims appended hereto, applicants wish to note that they do not intend any of the appended claims to invoke 35 U.S.C. § 112, ¶6 as it exists on the date of filing hereof unless "means for" or "step for" are used in the particular claim.

What is claimed is:

1. A method for reducing transmit echo in a DSL modem, comprising:
   receiving an incoming signal over a communications line at each one of a plurality of cancellation devices;
   estimating an impedance of the communications line;
   selecting at least one cancellation device of the plurality of cancellation devices based at least in part on the estimated impedance;
   generating an attenuation signal using the selected cancellation device; and
   removing at least a portion of transmit echo from the received incoming signal using the attenuation signal.

2. The method of claim 1, wherein the plurality of cancellation devices comprises:
   a first cancellation device operable to generate the attenuation signal for a first loop topology; and
   a second cancellation device operable to generate the attenuation signal for a second loop topology.

3. The method of claim 2, wherein the plurality of cancellation devices further comprises:
   a third cancellation device operable to generate the attenuation signal for a third loop topology and further operable to generate the attenuation signal for a fourth loop topology.

4. The method of claim 1, wherein the plurality of cancellation devices comprises at least one of a passive cancellation device and an active cancellation device.

5. The method of claim 1, wherein the attenuation signal substantially equals the transmit echo.

6. The method of claim 1, further comprising:
transmitting a transmit signal;
receiving transmit echo;
generating a first attenuation signal using a first cancellation device;
determining a first received energy;
generating a second attenuation signal using a second cancellation device;
determining a second received energy; and
wherein selecting at least one cancellation device of the plurality of cancellation devices based at least in part on the estimated impedance comprises selecting the cancellation device associated with the lowest received energy.

7. The method of claim 1, further comprising:
transmitting a transmit signal;
analyzing the transmit echo associated with the transmit signal; and
estimating the transmit echo transfer function, at least in part, on the transmit echo, wherein selecting at least one cancellation device of the plurality of cancellation devices based at least in part on the estimated impedance comprises selecting the cancellation device based at least in part upon an estimated transmit echo transfer function.

8. An adaptive cancellation network, comprising:
a first cancellation device operable to generate a first attenuation signal;
a second cancellation device operable to generate a second attenuation signal; and
a controller operable to select at least one of the cancellation devices based at least in part upon an estimated impedance, wherein the attenuation signal associated with the selected cancellation device is used to attenuate transmit echo.

9. The adaptive cancellation network of claim 8, wherein the controller is further operable to analyze received energy and to select the cancellation device associated with the lowest received energy.

10. The adaptive cancellation network of claim 8, further comprising a switch, wherein the controller is further operable to communicate a control signal to the switch and the switch is operable to select one of the cancellation devices in response to the control signal.

11. A DSL modem, comprising:
a plurality of cancellation devices configured to receive an incoming signal over a communications line; and
circuitry operable to estimate an impedance of the communications line, select at least one cancellation device of the plurality of cancellation devices based at least in part on the estimated impedance, generate an attenuation signal using the selected cancellation device, and remove at least a portion of transmit echo transfer function from the received incoming signal using the attenuation signal.

12. The DSL modem of claim 11, wherein the plurality of cancellation devices comprises:
a first cancellation device operable to generate the attenuation signal for a first loop topology; and
a second cancellation device operable to generate the attenuation signal for a second loop topology.

13. The DSL modem of claim 12, wherein the plurality of cancellation devices further comprises:
a third cancellation device operable to generate the attenuation signal for a third loop topology and further operable to generate the attenuation signal for a fourth loop topology.

14. The DSL modem of claim 11, wherein the plurality of cancellation devices comprises at least one of a passive cancellation device and an active cancellation device.

15. The DSL modem of claim 11, wherein the attenuation signal substantially equals the transmit echo.

16. The DSL modem of claim 11, wherein the circuitry is further operable to:
transmit a transmit signal;
receive transmit echo;
generate a first attenuation signal using a first cancellation device;
determine a first received energy;
generate a second attenuation signal using a second cancellation device;
determine a second received energy; and
wherein the circuitry operable to select at least one cancellation device of the plurality of cancellation devices based at least in part on the estimated impedance comprises the circuitry operable to select the cancellation device associated with the lowest received energy.

17. The DSL modem of claim 11, wherein the circuitry is further operable to:
transmit a transmit signal;
analyze a transmit echo of the transmit signal; and
estimate the impedance of the communications line based, at least in part, on the transmit echo.

18. The DSL modem of claim 11, wherein the DSL modem resides at the central office.

19. The DSL modem of claim 11, wherein the DSL modem resides at the customer premises.

* * * * *